(12) United States Patent
Nakajima et al.

(10) Patent No.: US 7,417,672 B2
(45) Date of Patent: Aug. 26, 2008

(54) IMAGING DEVICE FOR IMAGING BASED UPON A REFERENCE COMPOSITION FOR A SUBJECT

(75) Inventors: Nobuyoshi Nakajima, Kaisei-machi (JP); Akira Yoda, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 634 days.

(21) Appl. No.: 09/837,171

(22) Filed: Apr. 19, 2001

(65) Prior Publication Data

US 2001/0048815 A1 Dec. 6, 2001

(30) Foreign Application Priority Data

Apr. 19, 2000 (JP) ............................. 2000-117668
Mar. 19, 2001 (JP) ............................. 2001-078012

(51) Int. Cl.
H04N 5/76 (2006.01)
H04N 5/225 (2006.01)

(52) U.S. Cl. ................................ 348/231.3; 348/207.99

(58) Field of Classification Search ................. 396/310, 396/287, 311; 348/207.99, 222.1, 231.3, 348/333.01, 333.02, 333.04, 208.15; 702/150
See application file for complete search history.

(56) References Cited

U.S. PATENT DOCUMENTS

| | | | | |
|---|---|---|---|---|
| 5,266,985 A | * | 11/1993 | Takagi | ........................ 396/147 |
| 5,296,884 A | * | 3/1994 | Honda et al. | ................. 396/311 |
| 5,486,893 A | * | 1/1996 | Takagi | ........................ 396/147 |
| 5,815,411 A | * | 9/1998 | Ellenby et al. | ............... 702/150 |
| 5,831,670 A | * | 11/1998 | Suzuki | ................... 348/208.15 |
| 5,870,741 A | * | 2/1999 | Kawabe et al. | .................. 707/5 |
| 6,201,571 B1 | * | 3/2001 | Ota | ............................. 348/239 |
| 6,246,837 B1 | * | 6/2001 | Kageyama et al. | .......... 396/287 |
| 6,459,388 B1 | * | 10/2002 | Baron | ........................ 340/996 |
| 6,539,177 B2 | * | 3/2003 | Parulski | ...................... 396/287 |
| 6,690,883 B2 | * | 2/2004 | Pelletier | ...................... 396/321 |

FOREIGN PATENT DOCUMENTS

| | | | |
|---|---|---|---|
| JP | 08294025 A | * | 11/1996 |
| JP | A8294025 | | 11/1996 |

* cited by examiner

*Primary Examiner*—David Ometz
*Assistant Examiner*—Luong T Nguyen
(74) *Attorney, Agent, or Firm*—Birch, Stewart, Kolasch & Birch, LLP

(57) ABSTRACT

Recommended composition data, which represent composition images recommended at locations of photography, are stored in a recommended-composition storage medium in correlation with positional information which represents the photography locations. A GPS section receives radio waves from GPS satellites and inputs GPS information to a read-out section. Based on the positional information in the GPS information, the read-out section retrieves the recommended composition data stored in the recommended-composition storage medium. If recommended composition data is desired, it is read out and input to a superposition section. The image data obtained by an imaging section is also input to the superposition section. The desired, recommended composition data and the image data are superposed and displayed on a display unit. The image data is displayed on the display unit in real time so that photographing can be performed with the image data coincident with the desired, recommended composition data.

32 Claims, 10 Drawing Sheets

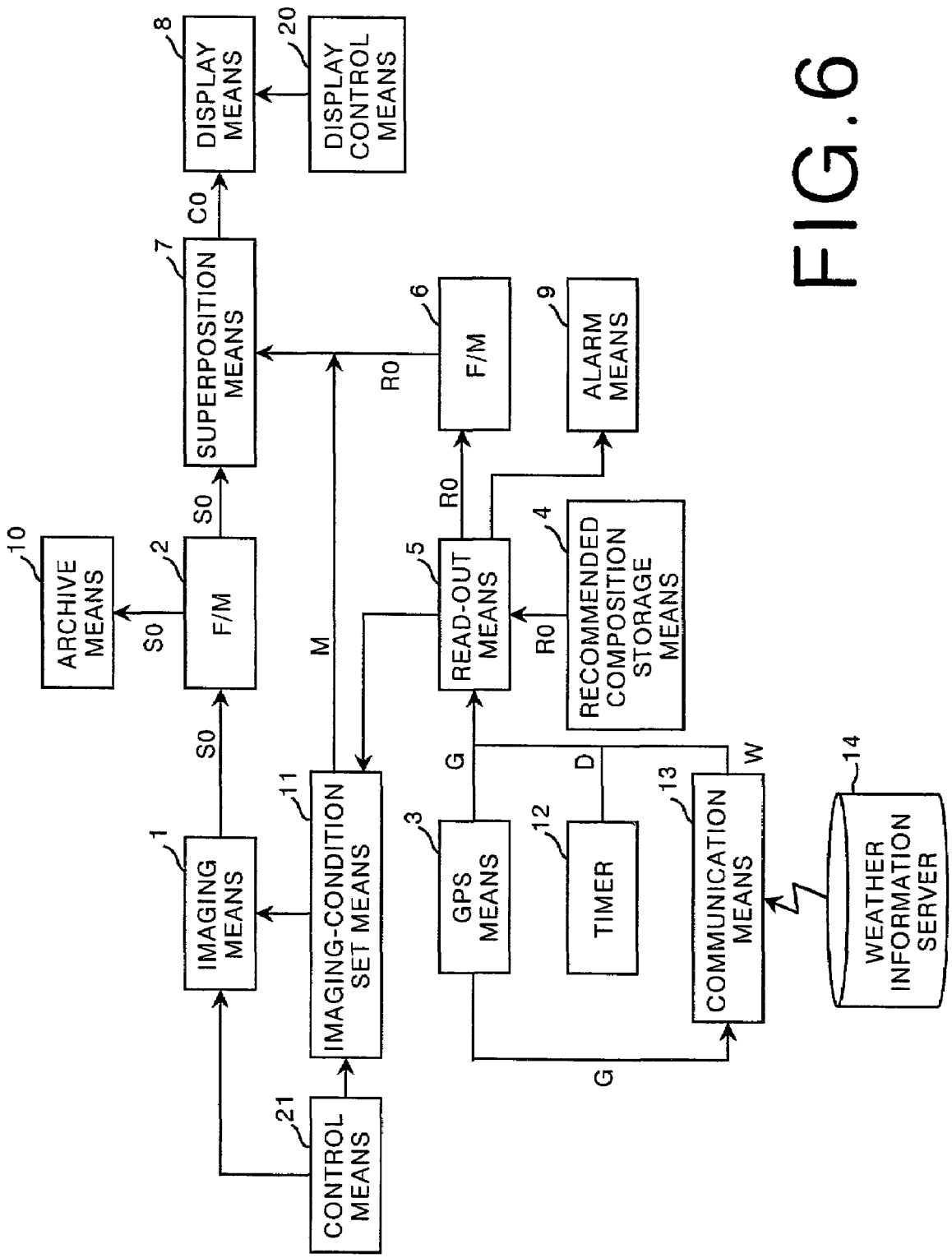

FIG.7

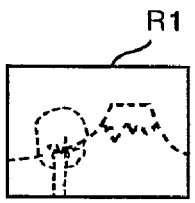

LOCATION;132° 26' 41" EAST LONGITUDE
AND 31° 28' 17" NORTH LATITUDE

RECOMMENDED PERIOD ; APR 30 TO JUN 20 ◎
　　　　　　　　　　　　JUN 21 TO JUL 31 ○
　　　　　　　　　　　　AUG 1 TO SEP 30 ◎
　　　　　　　　　　　　NOV 21 TO FEB 28 ✕
　　　　　　　　　　　　OTHER PERIODS　△

RECOMMENDED TIME ; MORNING AND EVENING ◎,
　　　　　　　　　　DAYTIME ○, NIGHT ✕

RECOMMENDED WEATHER ; FINE △, CLEAR ○,
　　　　　　　　　　　　SLIGHTLY CLOUDY ◎,
　　　　　　　　　　　　CLOUDY △, RAINY ✕

IMAGING CONDITIONS

LENS ; 70 TO 100mm◎, 50 TO 70mm△,
　　　　LESS THAN 50mm✕, 100 TO 200mm ○,
　　　　GREATER THAN 200mm ✕

STROBOSCOPE ; MORNING AND NIGHT "ON",
　　　　　　　　DAYLIGHT "AUTO"

DIAPHRAGM STOP ; F6 TO 8 ○,
　　　　　　　　　GREATER THAN F8 ◎,
　　　　　　　　　LESS THAN F4.5✕

FIG.8

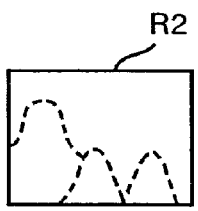

R2

LOCATION ; 132° 26' 41" EAST LONGITUDE AND 31° 28' 17" NORTH LATITUDE

RECOMMENDED PERIOD ; APR 30 TO JUN 20 ◎
　　　　　　　　　　　JUN 21 TO JUL 31 ×
　　　　　　　　　　　AUG 1 TO SEP 30 ○
　　　　　　　　　　　NOV 21 TO FEB 28 ◎
　　　　　　　　　　　OTHER PERIODS ○

RECOMMENDED TIME ; MORNING AND EVENING ◎,
　　　　　　　　　　DAYTIME ○, NIGHT ×

RECOMMENDED WEATHER ; FINE △, CLEAR ○,
　　　　　　　　　　　SLIGHTLY CLOUDY ◎,
　　　　　　　　　　　CLOUDY △, RAINY ×

IMAGING CONDITIONS

LENS ; 70 TO 100mm ×, 50 TO 70mm △,
　　　LESS THAN 50mm ◎, 100 TO 200mm ×,
　　　GREATER THAN 200mm ×

STROBOSCOPE ; MORNING AND NIGHT "ON",
　　　　　　　DAYLIGHT "AUTO"

DIAPHRAGM STOP ; F6 TO F8 ○,
　　　　　　　　GREATER THAN F8 ◎,
　　　　　　　　LESS THAN F4.5 ×

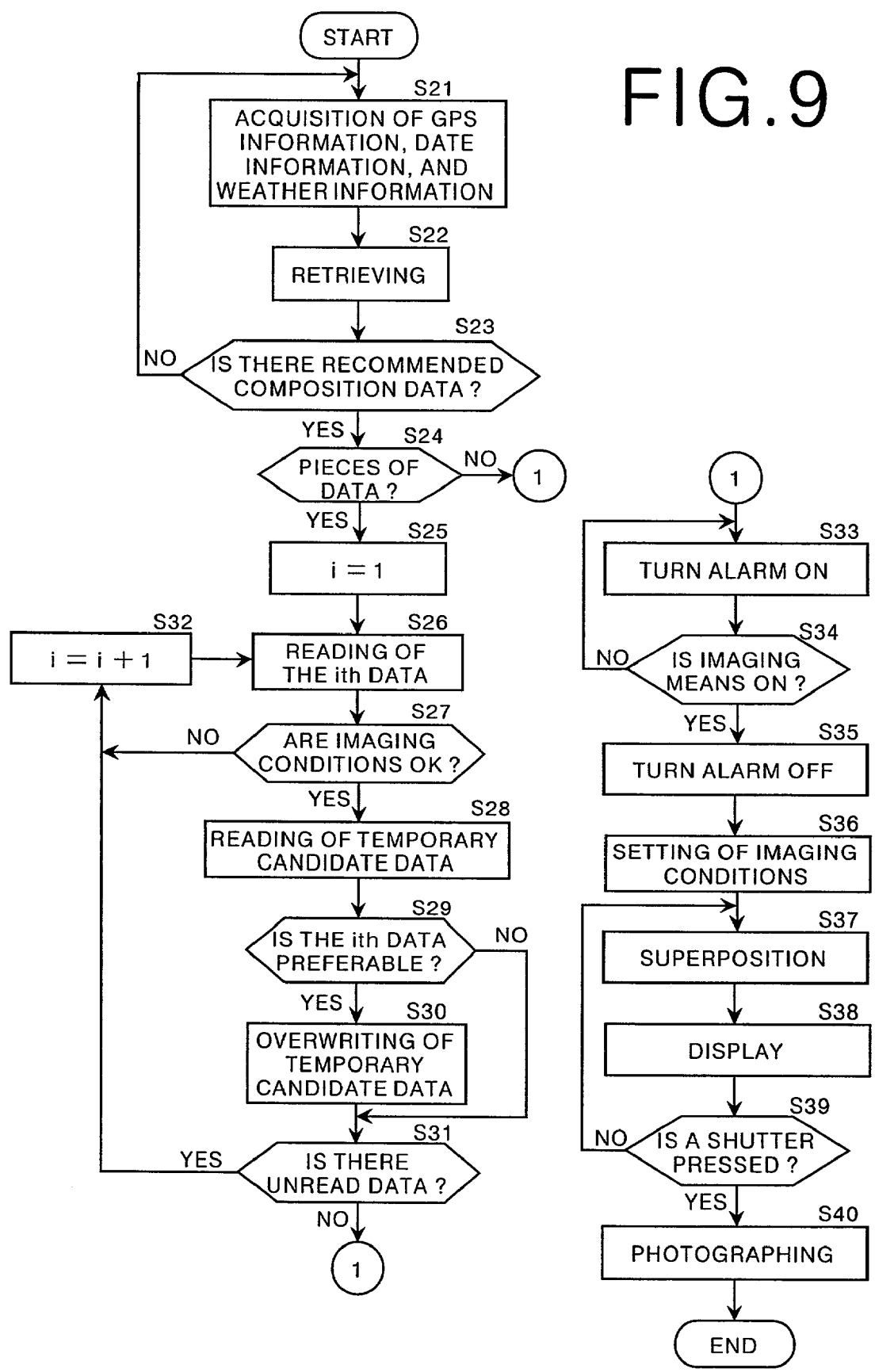

IMAGING DEVICE FOR IMAGING BASED UPON A REFERENCE COMPOSITION FOR A SUBJECT

BACKGROUND OF THE INVENTION

1. Field of the Invention

The present invention relates to an imaging device, such as a camera, etc., which can photograph a subject so that the photograph of the subject coincides with a recommended composition.

2. Description of the Related Art

There has been proposed a camera that can take a photograph so that the photograph coincides with a desired composition, by displaying information about composition on the viewfinder or liquid crystal monitor (Japanese Unexamined Patent Publication No. 8(1996)-294025). In this camera, a scene is previously photographed to acquire information on reference composition that becomes a reference when photographing the scene. Also, the reference composition, and the image of the scene being input from the imaging means in real time, are displayed on display means such a viewfinder, a liquid crystal panel, etc. If such a camera is used, a photographer can obtain an image photographed so that it becomes a suitable composition, by causing the reference composition and the image of the scene to coincide with each other.

However, in the camera disclosed in the above-mentioned Japanese Unexamined Patent Publication No. 8(1996)-294025, the quality of an image which is obtained based on a reference composition depends largely upon the skill of a photographer, because the reference composition is determined beforehand and put into the camera by the photographer. In addition, even if a place where the photographer is situated is a noted place for sight-seeing, there will be a possibility that the photographer will miss a chance to press the shutter.

SUMMARY OF THE INVENTION

The present invention has been made in view of the aforementioned circumstances. Accordingly, it is the primary object of the present invention to provide an imaging device, such as a camera, etc., which is capable of performing photography, based on a suitable composition, without depending on the skill of a photographer.

To achieve this end and in accordance with the present invention, there is provided an imaging device comprising imaging means for imaging a subject to acquire image data which represents the subject; storage means for storing recommended composition data, which represent composition images recommended at various locations of photography, in correlation with photography information containing positional information which represents the various photography locations; photography information acquisition means for acquiring the photography information; read-out means for reading out desired, recommended composition data correlated with photography information which corresponds to the acquired photography information, from the storage means, based on the acquired photography information; and display means for superposing and displaying a recommended composition image represented by the desired, recommended composition data and an image represented by the image data.

The "storage means" may be a portable medium in which recommended composition data are stored by areas or purposes, or may be a medium in which recommended composition data are rewritable. The photography information may be stored in the storage means in correlation with the recommended composition data by being described in the tab or header information of the recommended composition data, or may be stored in the storage means in correlation with the recommended composition data, as data for another file separate from the recommended composition data.

The "recommended composition" refers to the artistic arrangement of the parts of a picture, representing a noted scene, structure, etc., which is to be photographed. The recommended composition data may represent recommended composition in various colors. However, it may be image data reduced in contrast, binary image data, or monochrome image data in order to reduce the amount of the data.

The "photography information acquisition means" is operated so that it can always acquire photography information transmitted from a source of photography information. Note that photography information acquisition switching means for switching the ON and OFF states of the photography information acquisition means may be provided so that the photography information acquisition means can be switched off when it is not necessary to perform photography by use of the recommended composition.

The "display means" can employ a wide variety of means such as the viewfinder of an imaging device, a liquid crystal monitor, etc.

The "positional information" can employ latitude and longitude, address, etc.

In the imaging device of the present invention, the aforementioned photography information may contain date information which represents various dates of photography, along with the positional information, and the aforementioned recommended composition data may represent composition images recommended on the various photography dates in addition to the various photography locations.

The "date information" can employ seasons, high and low tides, waxing and waning of the moon, etc., in addition to year, month, and date, and time.

In the imaging device of the present invention, the aforementioned photography information may contain weather information which represents various weather recommended at the photography locations, along with the positional information, and the aforementioned recommended composition data may represent composition images recommended under the various weather conditions in addition to the various photography locations.

The "weather information" can employ information, which represents weather in itself, such as fine, clear, slightly cloudy, cloudy, rainy, snowy, and foggy weather.

In the imaging device of the present invention, the aforementioned photography information acquisition means may include global positioning system (GPS) means for acquiring GPS information as the photography information, based on radio waves from GPS satellites. Also, the aforementioned read-out means may read out the desired, recommended composition data correlated with photography information which contains positional information corresponding to the GPS information, from the storage means, based on the GPS information.

The "GPS information" includes information representing location and information representing direction. Preferably, it includes information representing date.

Note that in the case of acquiring positional information, means for receiving global positional information from a PHS reception area can also be employed instead of the GPS means.

In the imaging device of the present invention, the aforementioned photography information acquisition means may include global positioning system (GPS) means for acquiring GPS information as the photography information, based on radio waves from GPS satellites. Also, the aforementioned read-out means may read out the desired, recommended composition data correlated with photography information which contains positional information and date information corresponding to the GPS information, from the storage means, based on the GPS information.

Note that the imaging device is often equipped with a clock which represents date, so the date information may be acquired with the clock attached to the imaging device.

In the imaging device of the present invention, the aforementioned photography information acquisition means may include global positioning system (GPS) means for acquiring GPS information as the photography information, based on radio waves from GPS satellites, and weather information acquisition means for accessing a weather information server which provides weather information recommended at the photography location, to acquire weather information recommended at the photography location. Also, the aforementioned read-out means may readout the desired, recommended composition data correlated with photography information, which contains positional information corresponding to the GPS information and the acquired weather information, from the storage means, based on the GPS information and the acquired weather information.

The "weather information acquisition means" can employ small terminal equipment, which can access the Internet, such as portable terminal equipment.

In the imaging device of the present invention, the aforementioned photography information acquisition means may include global positioning system (GPS) means for acquiring GPS information as the photography information, based on radio waves from GPS satellites, and weather information acquisition means for accessing a weather information server which provides weather information recommended at the photography location, to acquire weather information recommended at the photography location. Also, the aforementioned read-out means may read out the desired, recommended composition data correlated with photography information, which contains positional information and date information corresponding to the GPS information and the acquired weather information, from the storage means, based on the GPS information and the acquired weather information.

The expression "desired, recommended composition data correlated with photography information which contains positional information" refers to recommended composition data that is recommended to be photographed at a position that approximately coincides with the positional information.

The expression "desired, recommended composition data correlated with photography information which contains date information" refers to recommended composition data that is recommended to be photographed at the date represented by the date information.

The expression "desired, recommended composition data correlated with photography information which contains weather information" refers to recommended composition data that is recommended to be photographed under the weather conditions contained in the weather information.

The imaging device of the present invention may further include archive means for archiving the image data acquired by the imaging means.

The "archive means" may be a portable storage medium such as a smart medium, a memory stick, etc. Also, the archive means may be any means, as long as it can record and archive image data on the storage medium provided in the imaging device of the present invention.

In the imaging device of the present invention, the aforementioned storage means may store imaging-condition information, which represents recommended imaging conditions suitable for archiving the image data in the archive means, in correlation with the recommended composition data. Also, the aforementioned read-out means may read out desired imaging-condition information correlated with the desired, recommended composition data, along with the desired, recommended composition data.

The words "imaging conditions" represent the focal length, diaphragm stop, and ON and OFF states of the strobe light of the imaging means at the time of photographing. The words "recommended imaging conditions" refer to imaging conditions under which photographing can be performed so that image data with optimum picture quality can be acquired.

The imaging device of the present invention may further include imaging-condition display means for displaying recommended imaging conditions represented by the desired imaging-condition information.

The "imaging-condition display means" is also used as display means. In this case, an image, recommended composition, and recommended imaging conditions are displayed on the display means.

The imaging device of the present invention may further include imaging-condition set means for setting the imaging means, based on recommended imaging conditions represented by the desired imaging-condition information. The imaging device of the present invention may further include imaging-condition-set switching means for switching ON and OFF states of the imaging-condition set means.

In the imaging device of the present invention, the aforementioned read-out means may read out only the desired, recommended composition data correlated with imaging-condition information which represents recommended imaging conditions settable in the imaging means.

In the imaging device of the present invention, the aforementioned recommended composition data may have attendant information related to the recommended composition images, and the aforementioned archive means may attach the attendant information to the image data when archiving the image data.

The words "attendant information" refer to information that represents the name, address, comments, keywords, etc., of a place where a recommended composition is obtained.

The imaging device of the present invention may further include read-out recognition means for informing that the desired, recommended composition data is read out, when reading out the desired, recommended composition data.

The "read-out recognition means" may be means for issuing an alarm with sound or voice, or may be means for displaying information, which indicates that recommended data has been read out, on the display means. Also, it may be means for generating vibration to a photographer by vibrating the imaging device.

In the imaging device of the present invention, the aforementioned display means may include selection display means for switching display and non-display of the recommended composition image.

The imaging device of the present invention may further include coincidence recognition means for informing that the recommended composition image displayed on the display means has coincided with the image representing the subject.

The "coincidence recognition means" may be means for giving an alarm with sound or voice, or maybe means for displaying information, which indicates that the image of a subject and the recommend composition image have coincided, on the display means. Also, it may be means for generating vibration to a photographer by vibrating the imaging device.

The imaging device of the present invention may further include photography-information-acquisition switching means for switching ON and OFF states of the photography information acquisition means.

The imaging device of the present invention may further include image switching means for switching ON and OFF states of the imaging means, and switching display means for sequentially displaying recommended composition images, represented by the recommended composition data stored in the storage means, on the display means when the imaging means is in the OFF state.

The imaging device of the present invention has the following advantages:

(1) The photography information, containing positional information which represents the location of a photographer having the imaging device, is acquired by the photography information acquisition means. Then, desired, recommended composition data correlated with photography information which corresponds to the acquired photography information is read out based on the acquired photography information. Next, a recommended composition image represented by the desired, recommended composition data, and an image represented by the image data, are superposed and displayed on the display means. The recommended data is correlated with the photography information which contains positional information representing the location of photography, and also represents the image of composition which is recommended at the photography location. For this reason, the recommended composition image displayed on the display means represents a composition image recommended at the location of a photographer having the imaging device of the present invention. Therefore, the photographer can confirm a composition image recommended at the location where he or she is situated, by viewing the display means.

(2) Since the photography information contains date information which represents the date of photography, the recommended composition data represents a composition image, recommended at the location where the photographer is situated, and recommended on the date when the photographer is taking a photograph. Therefore, the photographer can confirm a composition image, recommended at the location where he or she is situated, and recommended on the date when he or she is taking a photograph, by viewing the display means.

(3) Since the photography information contains weather information which represents weather recommended at location of photography, the recommended composition data represents a composition image, recommended at the location where the photographer is situated, and recommended under the weather conditions when the photographer is taking a photograph. Therefore, the photographer can confirm a composition image, recommended at the location where he or she is situated, and recommended under the weather conditions when he or she is taking a photograph, by viewing the display means.

(4) Since the photography information contains date information which represents the date of photography and weather information which represents weather recommended at the location of photography, the recommended composition data represents a composition image, recommended at the location where the photographer is situated, and recommended on the date and under the weather when the photographer is taking a photograph.

Therefore, the photographer can confirm a composition image, recommended at the location where he or she is situated, and recommended on the date and under the weather when he or she is taking a photograph, by viewing the display means.

(5) Therefore, if the image represented by the image data acquired by the imaging means is caused to coincide with the recommended composition image, photographing can be performed based on the recommended composition without depending on the skill of a photographer, and the photographer will not miss a chance to press the shutter.

(6) The imaging-condition information, which represents recommended imaging conditions suitable for archiving the image data in the archive means, is stored in correlation with the recommended composition data. Also, desired imaging-condition information correlated with desired, recommended composition data is read out along with the desired, recommended composition data. Therefore, if the imaging means is set based on the desired imaging-condition information, image data can be acquired and archived according to the imaging conditions suitable for the recommended composition without troubling the photographer.

(7) Since the recommended imaging conditions are displayed on the imaging-condition display means, the photograph can easily confirm the recommended imaging conditions. Therefore, the acquisition of image data under imaging conditions corresponding to recommended composition can be more easily performed.

(8) If the imaging means is set based on the recommended imaging conditions by the imaging-condition set means, the photographer does not need to set imaging conditions and can reduce troublesome setting operations.

(9) The ON and OFF states of the imaging-condition set means can be switched by the imaging-condition-set switching means. Therefore, in the case where the photographer wishes to set imaging conditions manually, the imaging conditions can be prevented from being set automatically. This enables the photographer to take a photograph according to his or her taste.

(10) The read-out means reads out only desired and recommended composition data correlated with imaging-condition information which represents recommended imaging conditions settable in the imaging means. Therefore, even if recommended composition is displayed on the display means, imaging conditions which cannot be set to the imaging device will not displayed. Thus, confusion of the photographer can be prevented.

(11) The recommended composition data can have attendant information related to the recommended composition image, and the archive means can attach the attendant information to the image data when archiving the image data. Therefore, image data can be efficiently arranged.

(12) The imaging device can include read-out recognition means for informing that the desired, recommended composition data is read out, when reading out the desired, recommended composition data. Therefore, the photographer can recognize that he or she is situated at a point where a recommended composition image is photographed. This enables the photographer to take pictures reliably without missing a chance to press the shutter.

(13) The display means can include selection display means for switching display and non-display of the recommended composition image. This can deal with the case where the photographer wishes not to display a recommended composition image, for example, when photographing is performed based on arbitrary composition.

(14) The imaging device can include coincidence recognition means for informing that a recommended composition image displayed on the display means has coincided with an image representing a subject. Therefore, the photographer can readily recognize that a recommended composition image has coincided with an image to be photographed. This enables the photographer to easily photograph the image of composition coincident with a recommended composition image.

(15) If the photography information acquisition means is switched off by the photography-information-acquisition switching means, the recommended composition data is not read out from the storage means. Thus, only the image photographed by the imaging means can be displayed on the display means.

(16) If the imaging means is switched off by the image control means, and the recommended composition images are sequentially read out, the recommended composition images can be enjoyed like a slide-show.

BRIEF DESCRIPTION OF THE DRAWINGS

The present invention will be described in further detail with reference to the accompanying drawings wherein:

FIG. 6 is a block diagram showing a camera constructed according to a second embodiment of the present invention;

FIG. 7 is a diagram showing header information attached to recommended composition data;

FIG. 8 is a diagram showing header information attached to different recommended composition data;

FIG. 9 is a flowchart used for explaining how the second embodiment of the present invention is operated.

DESCRIPTION OF THE PREFERRED EMBODIMENTS

Figure 1:
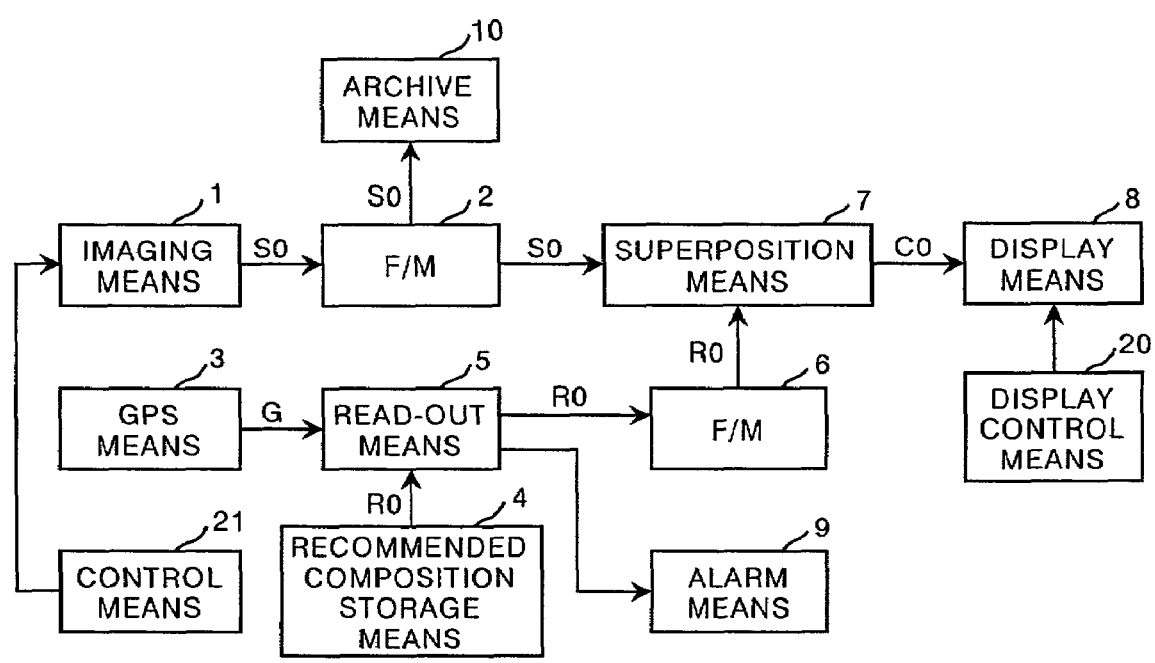
FIG. 1 is a block diagram showing a camera constructed according to a first embodiment of the present invention.

Referring now in greater detail to the drawings and initially to FIG. 1, there is shown a camera in accordance with a first embodiment of an imaging device of the present invention. As shown in the figure, the camera in the first embodiment is equipped with imaging means 1 for imaging a subject to obtain image data S0 which represents the subject image; frame memory 2 for temporarily storing the image data S0; global positioning system (GPS) means 3 for acquiring GPS information G, based on radio waves from GPS satellites; recommended composition storage means 4 for storing recommended composition data R, which represent composition images recommended at locations of photography, in correlation with positional information representing the photography positions; read-out means 5 for reading out, from the recommended composition storage means 4, recommended composition data R0 correlated with the positional information which corresponds to the GPS information G, based on the GPS information G acquired by the GPS means 3; frame memory 6 for temporarily storing the recommended composition data R0; superposition means 7 for superposing the image data S0 and the recommended composition data R0 to obtain superposed image data C0; display means 8 for displaying the superposed image data C0; alarm means 9 for issuing an alarm when the read-out means 5 reads out the recommended composition data R0; archive means 10 for archiving the photographed image data S0 on a storage medium such as smart media, compact flash memory, etc.; display control means 20 for controlling the display means 8; and image control means 21 for controlling the imaging means 1.

The imaging means 1 has a wide variety of means, needed for photographing, such as a CCD, an image optics system, a shutter, a zoom mechanism, an AE mechanism, an AF mechanism, a strobe flash mechanism, etc.

The GPS means 3 utilizes radio waves from GPS satellites to acquire GPS information G on the location of photography, azimuth of photography, and date of photography. The location of photography indicates a location at which the camera in the first embodiment (or a photographer) is situated, and is represented by latitude and longitude. The azimuth of photography refers to an azimuth in which the camera in the first embodiment is directed.

The recommended composition storage means 4 is a portable medium in which the recommended composition data R are stored by areas or purposes. The recommended composition storage means 4 is used by being set in the camera of the first embodiment of the present invention. In the case where the recommended composition storage means 4 is writable, a photographer can store the aforementioned recommended composition data R in the recommended composition storage means 4 by writing recommended composition data R for a predetermined area or purpose. The recommended composition data R represent, for example, composition images that are recommended in performing photography at a certain place noted for sight-seeing, and each recommended composition data R is stored in the recommended composition storage means 4 in correlation with positional information on each recommended composition. If the recommended composition storage means 4 is used, for example, for the principal sights of Kyoto, the recommended composition image will represent the image of composition that is recommended in performing photography at a place noted for sight-seeing, such as the Horyu Temple, the Temple of the Golden Pavilion, etc.

The read-out means 5 retrieves the recommended composition data R, based on the positional information contained in the GPS information G, and reads out the recommended composition data R0, which corresponds to the positional information contained in the GPS information G, from the recommended composition storage means 4 and temporarily stores the recommended composition data R0 in the frame memory 6.

The superposition means 7 is used for superposing the image data S0 and the recommended composition data R0 to obtain the superposed image data C0. For example, in the case where a recommended composition image represented by the recommended composition data R0 (which will hereinafter be referred to as a recommended composition image R0) is a composition image shown in FIG. 2, and an image represented by the image data S0 (which will hereinafter be referred to as an image S0) is an image shown in FIG. 3, the superposed image data C0 obtained by the superposition means 7 represents a superposed image (hereinafter referred to as a superposed image C0) shown in FIG. 4. The superposed image C0 is displayed on the display means 8. If the contrast of the recommended composition image represented by the recommended composition data R0 is made lower than that of the image represented by the image data S0, the image S0 can be prevented from being made difficult to view. The recommended composition image may be either a monochrome image or a binary image. Note that the recommended composition data R may be stored in the recommended composition storage means 4 as image data which represent low-contrast images, monochrome images, binary images, images with only a contour, etc.

The display means 8 is a liquid crystal panel provided in the camera of the first embodiment. Instead of the liquid crystal panel, the camera may be provided with a viewfinder so that an image can be displayed within the viewfinder.

The alarm means 9 issues an alarm to inform the photographer that he or she is situated at the location of photography where a recommended composition is obtained, if it detects that the read-out means 5 has read out the recommended composition data R0. Also, that effect may be displayed on the display means 8, or the photographer may be informed of that effect by vibration. Note that the alarm means 9 may output a voice instead of an alarm. The alarm means 9 corresponds to read-out recognition means of the present invention.

The display control means 20 has the function of switching display and non-display of the recommended image data R0 onto the display means 8.

The control means 21 has the function of switching the ON and OFF states of the imaging means 1.

Figure 5:
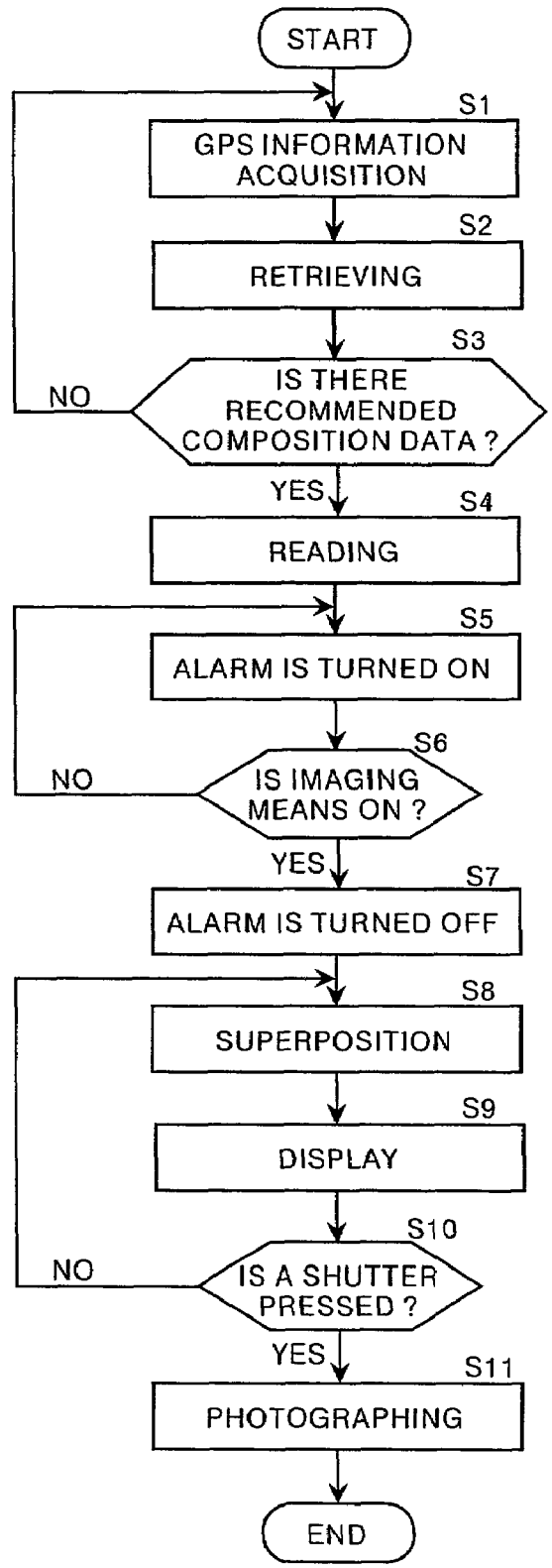
FIG. 5 is a flowchart used to explain how the first embodiment of the present invention is operated.

Now, the operation of the first embodiment of the present invention will be described with reference to FIG. 5. In the first embodiment of the present invention, a photographer carries the camera. Assume that as the initial state, the imaging means 1 is in its OFF state and only the GPS means 3 is in its ON state.

Figure 2:
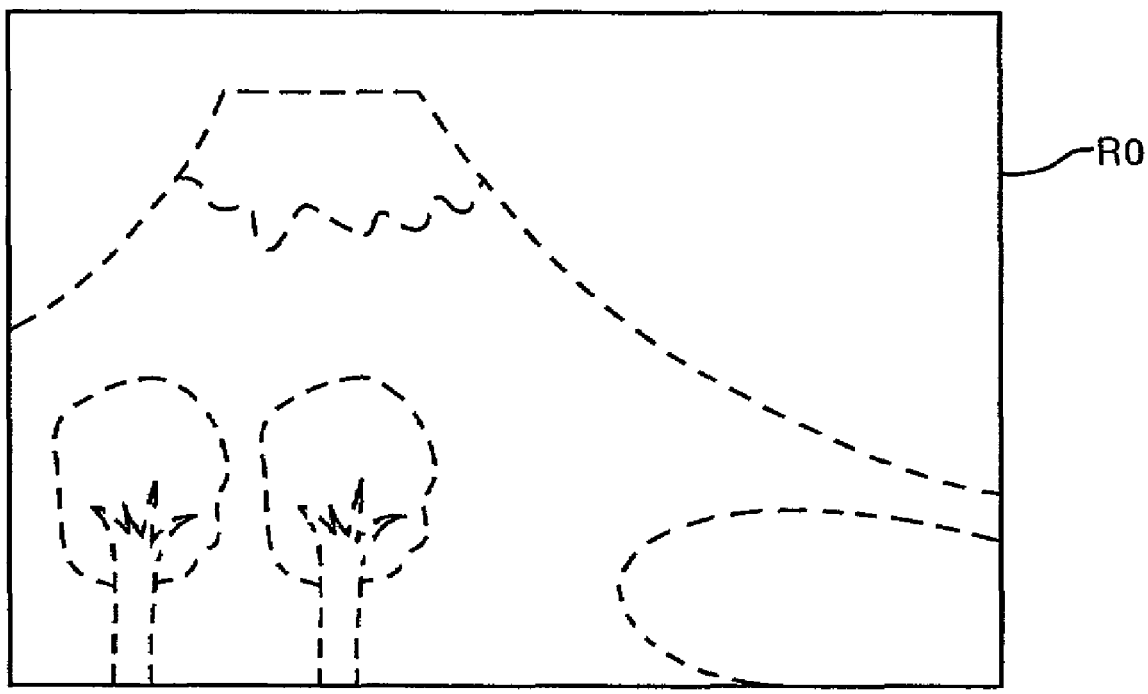
FIG. 2 is a diagram showing a recommended composition image.
Figure 3:
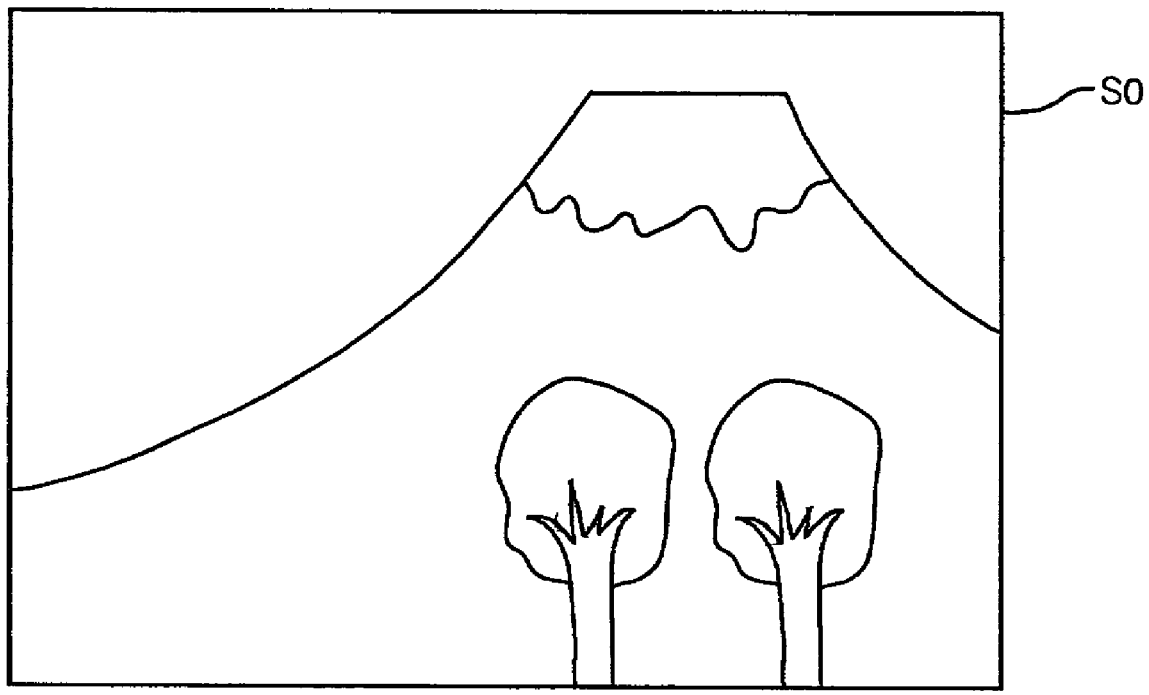
FIG. 3 is a diagram showing a photographed image.

The GSP means 3 acquires GPS information G, based on the radio waves from the GPS satellites (step S1). The read-out means 5 retrieves the recommended composition data R stored in the recommended composition storage means 4, based on the positional information contained in the GPS information G (step S2). Then, it is judged whether or not the recommended composition data R0, which corresponds to the positional information contained in the GPS information G, has been stored in the recommended composition storage means 4 (step S3). If it has not been stored, the process returns to step S1 to repeat steps S1 through S3. If it has been stored, the recommended composition data R0 is read out from the recommended composition storage means 4 (step S4). The recommended composition data R0 is stored temporarily in the frame memory 6 and is then input to the superposition means 7. If the recommended composition data R0 is read out from the recommended composition storage means 4, an alarm is issued by the alarm means 9 (step S5). Assume that in the first embodiment of the present invention, the recommended composition data R0 representing the recommended composition image shown in FIG. 2 is read out. The photographer switches on the imaging means 1 if he or she hears to the alarm (step S6). If the imaging means 1 is switched on, the alarm means 9 is switched off (step S7).

Figure 4:
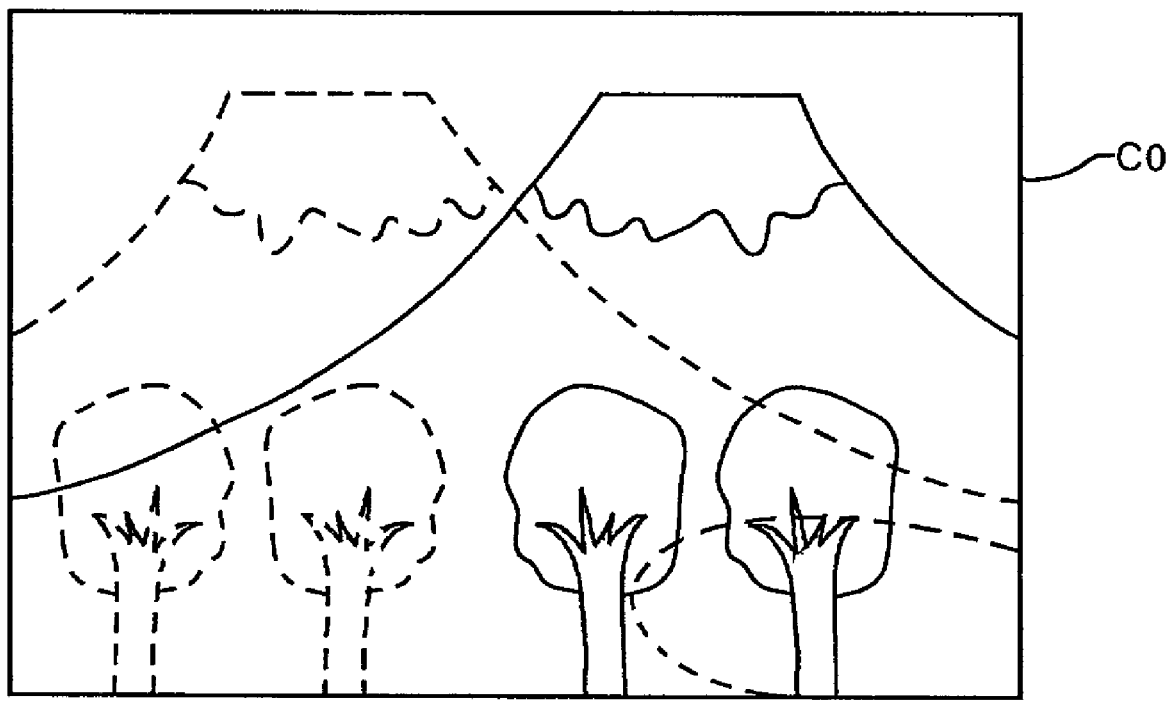
FIG. 4 is a diagram showing a superposed image of the recommended composition image of FIG. 2 and the image of FIG. 3.

If the imaging means 1 is switched on, the image data representing the image S0 obtained by the imaging means 1 is temporarily stored in the frame memory 2 and is also input to the superposition means 7 so that it is displayed on the display means 8 in real time. In the superposition means 7, the recommended composition image R0 and the image S0 represented by the image data S0 are superposed (step S8). For example, the superposed image C0 shown in FIG. 4 is displayed on the display means 8 (step S9).

The photographer adjusts the direction or zoom function of the camera so that the recommended composition image R0 and the image S0 coincide with each other, while viewing the superposed image C0 displayed on the display means 8. If the shutter is pressed with the recommended composition image R0 and the image coincident with each other (step S10), photographing is performed and the image data S0 is stored in the storage medium of the achieve means 10 (step S11). In this manner, the process ends. Note that the superposition and display of the image S0 and the recommended composition image R0 are repeated until the shutter is pressed.

Thus, according to the first embodiment of the present invention, the recommended composition image R0 at the location of the photographer with the camera of the first embodiment of the present invention is displayed on the display means 8 along with the image S0 to be photographed. For this reason, the photograph can confirm the recommended composition image R0 that is recommended at the location of the photographer, by viewing the display means 8. This enables the photographer to perform photography by recommended composition without depending on the skill of the photographer, and also eliminates missing a chance to press the shutter.

In addition, since the alarm means 9 issues an alarm when reading out the recommended composition data R0, the photographer can recognize that he or she is situated at a point where a recommended composition image is photographed. This enables the photographer to perform photography reliably without missing a chance to press the shutter.

Note that the alarm means 9 may issue an alarm when the recommended composition image R0 and the image S0 coincide. In this case, the photographer can easily recognize that the recommended composition image R0 and the image S0 have coincided. Therefore, the photographer can readily photograph a composition image that coincides with a recommended composition image. Note that the alarm means 9 in this case corresponds to recognition means of the present invention.

Related information, such as comments on recommended composition images and places of photography, etc., may be attached to the recommended composition data R, and in the archive means 10, the related information may be attached to the image data S0 when archiving the image data S0 in the storage medium. In this case, related information can be added when pasting photographs in an album, or related information can be used in retrieving the image data SO. Thus, photographs (image data S0) can be efficiently arranged.

Displaying of a recommended composition image may be switched in the display means 8 by the display control means 20. In this case, when an arbitrary composition is employed, photographing can be performed without being disturbed by recommended composition images. The display control means 20 in this case corresponds to selection display means of the present invention.

If the GPS means 3 is switched off, the recommended composition data R will not be read out from the recommended composition storage means 4. Therefore, only an image photographed by the imaging means 1 can be displayed on the display means 8.

Furthermore, by switching off the imaging means 1 by the image control means 21, and sequentially reading out the recommended composition data R0 stored in the recommended composition storage means 4 from the read-out means 5, the recommended composition data R0 can be displayed on the display means 8 by the display control means 20. In this case, the recommended composition images can be enjoyed like a slide-show.

The display control means 20 in this case corresponds to switching display means of the present invention, and the control means 21 corresponds to image switching means of the present invention.

While the first embodiment of the present invention is provided with the frame memory 2 for the image data S0 and the frame memory 6 for the recommended composition data R0, frame memory instead of the frame memories 2 and 6 may be provided between the superposition means 7 and the display means 8, because the recommended composition data R0 does not change in real time. In this case, the recommended composition data R0 read out from the read-out means 5 is input directly to the superposition means 7, in which the image data S0 and the recommended composition data R0 are superposed. The superposed data is stored temporarily in the frame memory and displayed on the display means 8.

While, in the first embodiment of the present invention, the alarm means 9 issues an alarm if the recommended composition data R0 is read out from the recommended composition storage means 4, it is not always necessary to provide the alarm means 9. In this case, if the image S0 obtained by the imaging means 1 is displayed on the display means 8, the photographer can confirm that he or she is situated at a point of photography, when the recommended composition image R0 is displayed.

Now, a description will be given of a second embodiment of the present invention. FIG. 6 shows a camera constructed according to the second embodiment of the present invention. The same reference numerals will be applied to the same parts as the first embodiment to avoid redundancy. The second embodiment of the present invention is equipped with imaging-condition set means 11 for setting imaging conditions for image data S0 which are employed in imaging means 1; a timer 12 for acquiring date information D which represents date of photography; and communication means (or weather information acquisition means) 13 for accessing a weather information server 14, which provides weather information recommended at the location of photography, to acquire weather information W recommended at the location of photography, based on GPS information G. The second embodiment of the present invention differs from the first embodiment in that control means 11 controls the imaging-condition set means 11.

In addition, in the second embodiment of the present invention, header information is attached to recommended composition data R. FIG. 7 shows header information attached to recommended composition data R1, and FIG. 8 shown header information attached to recommended composition data R2. Each item of header information contains the location (latitude and longitude) of the recommended composition, date (recommended period and recommended time) suitable for photographing the recommended composition, recommended weather suitable for photographing the recommended composition, and imaging conditions. For instance, in the header information of the recommended composition data R1 shown in FIG. 7, the location is described as 132° 26'41" East Longitude and 31° 28'17" North Latitude. Also, the recommended period is described as ◉for April 30 to June 20, ○ for June 21 to July 31, ◉for August 1 to September 30, × for November 21 to February 28, and Δ for other periods. The recommended time is described as ◉for morning and evening, ○ for daytime, and × for night time. The recommended weather is described as Δ for fine weather, ○ for clear weather, ◉for slightly cloudy weather, Δ for cloudy weather, and × for rainy weather. For the imaging conditions, the focal length of a lens is described as ◉for 70 to 100 mm, Δ for 50 to 70 mm, × for less than 50 mm, ○ for 100 to 200 mm, and × for greater than 200 mm, the strobe light is described as "ON" for morning and night and "AUTO" for daylight, and the diaphragm stop is described as ○ for F6 to F8, ◉for greater than F8, and × for less than F4.5. Note that the symbols are gradually reduced in degree of preference in the order of ◉, ○, Δ, and × . In the second embodiment of the present invention, the imaging condition given ◉is referred to as a recommended imaging condition.

In the header information of the recommended composition data R2 shown in FIG. 8, the location is described as 132° 26'41" East Longitude and 31° 28'17" North Latitude, as with the header information of the recommended composition data R1 shown in FIG. 7. Also, the recommended period is described as ◉for April 30 to June 20, × for June 21 to July 31, ○ for August 1 to September 30, ◉for November 21 to February 28, and ○ for other periods. The recommended time is described as ◉for morning and evening, ○ for daytime, and × for night. The recommended weather is described as Δ for fine weather, ○ for clear weather, ◉for slightly cloudy weather, Δ for cloudy weather, and × for rainy weather. For the imaging conditions, the focal length of a lens is described as × for 70 to 100 mm, ○ for 50 to 70 mm, ◉for less than 50 mm, × for 100 to 200 mm, and × for greater than 200 mm, the strobe light is described as "ON" for morning and night and "AUTO" for daylight, and the diaphragm stop is described as ○ for F6 to F8, ◉for greater than F8, and × for less than F4.5.

The imaging-condition set means 11 extracts the recommended imaging condition M from the imaging conditions described in the header information of the recommended composition data R0 read out by the read-out means 5, and sets the zoom mechanism, strobe flash mechanism, and AE mechanism, of the imaging means 1 so that the recommended imaging condition M is obtained. The recommended imaging condition M is also input to superposition means 7, in which the recommended composition data R0 and the image data S0 are superposed. The superposed data C0 is displayed on display means 8.

The GPS means 6, as with the first embodiment of the present invention, takes advantage of the radio waves from GPS satellites to acquire GPS information G on location of photography, azimuth of photography, and date of photography. However, the second embodiment of the present invention employs only information on location of photography.

The timer 12 is used for generating date information D on date of photography, which is attached to the image data S0, when the image data S0 is archived in the storage medium of the archive means 10. However, in the second embodiment of the present invention, the date information D is employed to read out the recommended composition data R.

The communication means 13 is used for accessing the weather information server 14, which provides weather information recommended at various areas, to acquire weather information W recommended at a location of photography specified by the GPS information G acquired by the GPS means 3.

Now, the operation of the second embodiment of the present invention will be described with reference to FIG. 9. In the second embodiment of the present invention, as with the first embodiment, a photographer carries the camera. Assume that as the initial state, the imaging means 1 is in the OFF state and the GPS means 3, the timer 12, and the communication means 13 are in the ON state.

The GPS means 3 acquires GPS information G, based on the radio waves from the GPS satellites (step S21). Also, the timer 12 acquires date information D, and the communication means 13 acquires weather information W for a location represented by the GPS information G from the weather information server 14 (step S21). The read-out means 5 retrieves through recommended composition data R stored in the recommended composition storage means 4, based on the positional information contained in the GPS information G (step S22). Then, it is judged whether or not the recommended composition data R, corresponding to the positional information contained in the GPS information G, has been stored in the recommended composition storage means 4 (step S23). If it has not been stored, the process returns to step S21 to repeat steps S21 through S23. If it has been stored, it is judged whether or not the recommended composition data R includes blocks of recommended composition data (step S24). In the case where it includes blocks of data, "i" (i=1 to N where N is the number of recommended composition data R) is set to 1 (step S25), and the $i^{th}$ recommended composition data Ri is read out (step S26).

The imaging conditions, attached to the recommended composition data Ri readout, are readout and it is judged whether or not the recommended imaging condition M given a symbol of ◎ can be set to the imaging means 1 (step S27). If it can be set, the recommended composition data R stored in the frame memory 7 (hereinafter referred to as temporary candidate data) is read out from the frame memory 7 as a temporary candidate (step S28). In the case of i=1, no read operation is performed because no candidate data is stored. Then, the temporary candidate data is compared with the $i^{th}$ recommended composition data Ri, and it is judged whether or not the $i^{th}$ recommended composition data Ri is preferable as recommended composition data Ri that is displayed on the display means 8 (step S29). More specifically, the recommended period, recommended time, and recommended weather described in the header information of the $i^{th}$ recommended composition data Ri are compared with those in the temporary candidate data, and it is judged whether or not (1) the date in the header of $i^{th}$ recommended composition data represented by the date information D acquired by the timer 12 is labeled with the more preferred symbol within the recommended range of date, (2) the time in the header of $i^{th}$ recommended composition data represented by the date information D is labeled with the more preferred symbol within the recommended range of time, and (3) the weather in the header of $i^{th}$ recommended composition data represented by the weather information W acquired by the timer 12 is labeled with the more preferred symbol within the recommended range of weather.

In the case where the judgment in step S29 is YES, the temporary candidate data is overwritten by the $i^{th}$ recommended composition data Ri (step S30). Subsequently, it is judged whether or not there is unread recommended composition data R (step S31). Note that in the case of i=1, no temporary candidate data is present and therefore the recommended composition data Ri at i=1 becomes temporary candidate data. In step S30, the data is written to the frame memory 7.

In the case where the judgement in step S31 is YES, "i" is set to i=i+1 (step S32) and the process returns to step S26 to repeat steps S26 through S31. Note that in the case where the judgement in step S27 is NO, the process advances to step S32 without performing step S28 and steps thereafter. Also, in the case where the judgement in step S29 is NO, the process advances to step S32 without overwriting temporary candidate data.

If the judgement in step S31 is NO, an alarm is issued by the alarm means 9 (step S33). The photographer switches on the imaging means 1 if he or she hears to the alarm (step S34). If the imaging means 1 is switched on, the alarm means 9 is switched off (step S35). If the imaging means 1 is switched on, imaging conditions for the imaging means 1 are set based on the temporary candidate data written to the frame memory 7, that is, the recommended imaging condition M described in the header information of the recommended composition data R0 (step S36). More specifically, the focal length, the strobe flash mechanism, and the AE mechanism are set.

Subsequently, the image data S0 representing the image obtained by the imaging means 1 is temporarily stored in the frame memory 2 and is also input to the superposition means 7 so that it is displayed on the display means 8 in real time. In the superposition means 7, the recommended composition image R0 and the image S0 represented by the image data S0 are superposed (step S37). The superposed image C0 is displayed on the display means 8 (step S38). The recommended imaging condition M is also displayed on the display means 8.

The photographer adjusts the direction or zoom function of the camera so that the recommended composition image R0 and the image S0 coincide with each other, while viewing the superposed image C0 displayed on the display means 8. If the shutter is pressed with the recommended composition image R0 and the image coincident with each other (step S39), photographing is performed, and the image data S0 is stored in the storage medium of the achieve means 10 (step S40). In this manner, the process ends. Note that the superposition and display of the image S0 and the recommended composition image R0 are repeated until the shutter is pressed.

Here, assume that a photographer with the camera of the second embodiment of the present invention storing the recommended composition data R1 and R2 of FIGS. 7 and 8 in the recommended composition storage means 4 visits the spot situated 132° 26'41" East Longitude and 31° 28'17" North Latitude in the daytime of August 10. In this case, the judgement in step S23 is YES and the judgement in step S24 is also YES. The recommended composition data R1 is first read out and step S27 is executed. Since the imaging means 1 of the camera of the second embodiment of the present invention is provided with the zoom function and AE function, as described above, recommended imaging conditions can be set and therefore the judgement in step S27 is YES. Then, the recommended composition data RI is stored in the frame memory 7 as temporary candidate data. Next, recommended composition data R2 is read out. For the recommended composition data R2, as with the recommended composition data R1, the judgement in step S27 is YES. Subsequently, in step S28, the temporary candidate data, that is, the recommended composition data R1 is read out from the frame memory 7. If the recommended composition data R2 is compared with the recommended composition data R1, it is found that the recommended composition data R1 is preferable, because the date of photography is August 10. Therefore, since the judgement in step S29 is NO and there is no unread data, the recommended composition data R1 is displayed on the display means 8. Also, the focal length is set to 70 to 100 mm by the zoom function of the imaging means 1, the strobe light to automatic action by the strobe flash function, and the diaphragm stop to greater than F8 by the AE mechanism.

On the other hand, if the recommended composition data R1 is read out when the imaging means 1 of the camera of the second embodiment of the present invention has a fixed focal point of 35 mm, the judgement in step S27 is NO, because the recommended imaging conditions cannot be set by the camera of the second embodiment. On the other hand, the recommended imaging conditions for the recommended composition data R2 can be set by the camera of the second embodiment, so the recommended composition data R2 is read out and displayed on the display means 8.

While the second embodiment of the present invention employs the date information D acquired by the timer, the date information contained in the GPS information G may be employed as the date information D.

In the second embodiment, the GPS means 3 acquires GPS information G and employs it as the positional information. However, the present invention may be provided with means for receiving global positional information from a PHS reception area. The global positional information may be employed as the positional information.

In the second embodiment, the recommended composition data R0 is read out based on the GPS information G, the date information D, and the weather information W. However, the recommended composition data R0 may be read out based on the GPS information G and the date information D, or based on the GPS information G and the weather information W.

In the second embodiment, the imaging-condition set means 11 sets the imaging conditions for the imaging means 1, based on the recommended imaging condition M. However, only the recommended imaging condition M may be displayed on the display means 8 without providing the imaging-condition set means 11. In this case, a photographer sets imaging conditions manually, based on the imaging condition M displayed on the display means 8. Also, the ON and OFF states of the imaging-condition set means 11 may be switched by the control means 21. This can meet the case where a photographer desires manual setting of imaging conditions. The control means 21 in this case corresponds to the imaging-condition-set switching means.

Figure 10:
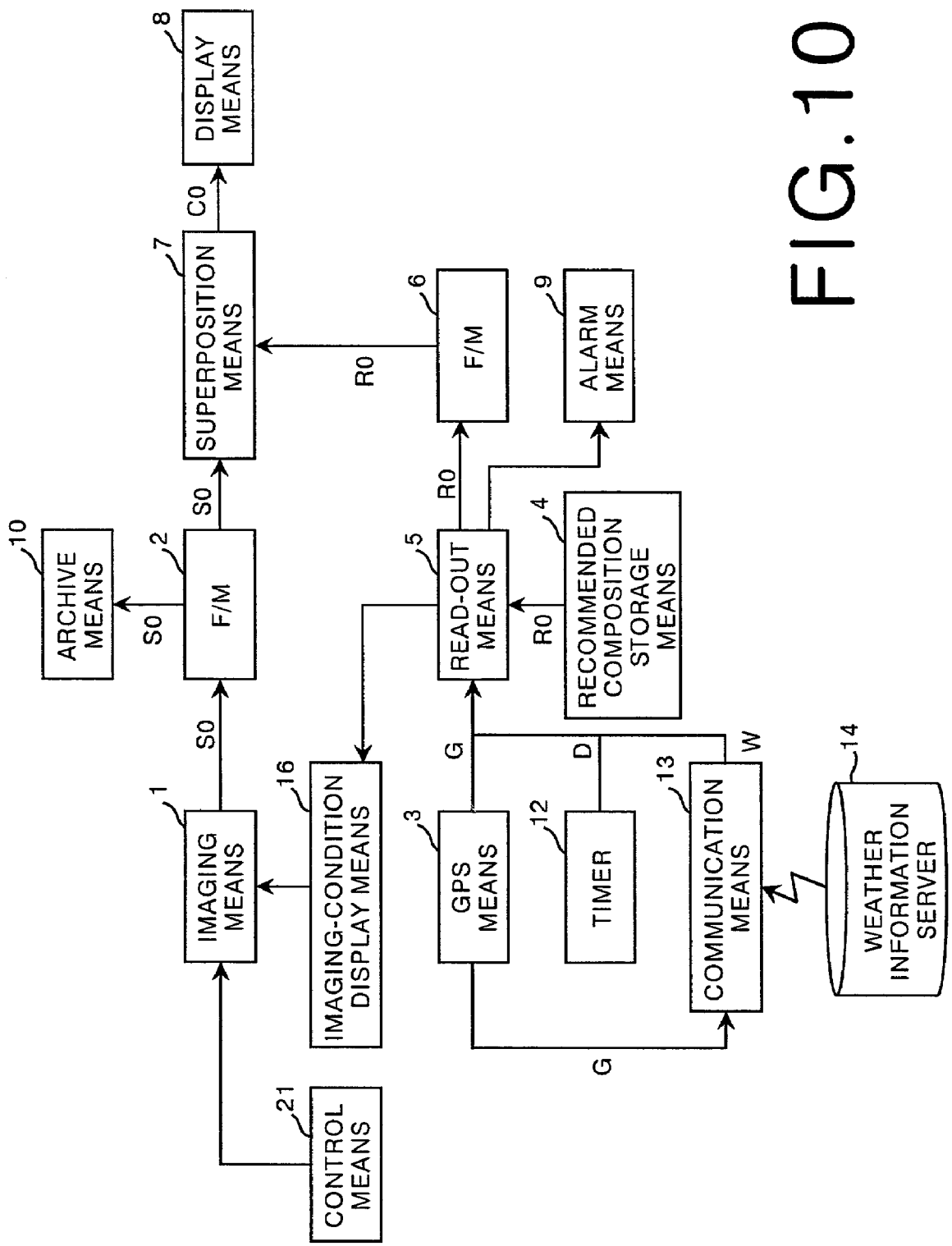
FIG. 10 is a block diagram showing a camera constructed according to a third embodiment of the present invention.

As in a camera of a third embodiment of the present invention shown in FIG. 10, imaging-condition display means 16 may be provided in addition to the display means 8. The recommended imaging condition M is displayed on the imaging-condition display means 16.

While the aforementioned embodiments of the present invention have been applied to the camera for archiving image data S0, the present invention is applicable to any type of imaging device for photographing a subject. For instance, the present invention is applicable to an electronic binocular. In this case, a marker representing a predetermined point is contained in recommended composition data. Then, a recommended composition image represented by the recommended composition data is caused to coincide with an image in the electronic binoculars, while viewing them through the electronic binoculars. With this, an observer can recognize that an important object is present at the marker portion. More particularly, if a marker is given at the position of a bird's nest in a recommended composition image, the nest can be easily discovered by causing an image in the electronic binoculars to coincide with the recommended composition image, when the electronic binoculars is employed in watching birds. If a place in a recommended composition image which is locked is marked, when the electronic binoculars is used for the purpose of guarding, forgetting to fasten a lock can be prevented, because the place to be locked can be easily recognized by causing the recommended composition image to coincide with an image in the electronic binoculars.

What is claimed is:

1. An imaging device comprising:
    imaging means for imaging a subject to acquire image data which represents said subject;
    storage means for storing recommended composition data, which represent composition images that represent an image of a composition that is recommended in performing photography at various locations, in correlation with photography information including positional information which represents said various photography locations;
    photography information acquisition means for acquiring said photography information;
    read-out means for reading out desired, recommended composition data correlated with the photography information which corresponds to said acquired photography information, from said storage means, based on said acquired photography information; and
        display means for superposing and displaying a recommended composition image represented by said desired, recommended composition data and an image represented by said image data,
    wherein along with said positional information included in the photography information, said photography information also includes date information which represents various recommended dates for performing photography at said various photography locations; and
    in addition to said various photography locations, said recommended composition data represent the composition images recommended on said various recommended dates for performing photography at said various photography locations,
    and when the photography information includes more than one recommended photography dates, each of the photography dates is ranked according to a relative degree of preference for performing photography.

2. The imaging device as set forth in claim 1,
    wherein along with said positional information included in the photography information, said photography information also includes weather information which represents various recommended weather conditions when performing photography at said various photography locations; and
    in addition to said various photography locations, said desired, recommended composition data represent composition images recommended under said various recommended weather conditions when performing photography at said various photography locations.

3. The imaging device as set forth in claim 2, wherein
    said photography information acquisition means includes global positioning system (GPS) means for acquiring GPS information as said photography information, based on radio waves from GPS satellites, and weather information acquisition means for accessing a weather information server which provides weather information recommended at said photography location, to acquire the weather information recommended at said photography location; and
    the read-out means reads out said desired, recommended composition data correlated with photography information, which contains the positional information and the date information corresponding to said GPS information and said acquired weather information, from said storage means, based on said GPS information and said acquired weather information.

4. The imaging device as set forth in claim 1, wherein
    said photography information acquisition means includes global positioning system (GPS) means for acquiring GPS information as said photography information, based on radio waves from GPS satellites; and
    the read-out means reads out said desired, recommended composition data correlated with photography information which contains the positional information corresponding to said GPS information, from said storage means, based on said GPS information.

5. The imaging device as set forth in claim 1, further comprising archive means for archiving the image data acquired by said imaging means.

6. The imaging device as set forth in claim 5, wherein
said storage means stores imaging-condition information, which represents recommended imaging conditions suitable for archiving said image data in said archive means, in correlation with said desired recommended composition data; and
said read-out means reads out desired imaging-condition information correlated with said desired, recommended composition data, along with said desired, recommended composition data.

7. The imaging device as set forth in claim 6, further comprising imaging-condition display means for displaying the recommended imaging conditions represented by said desired imaging-condition information.

8. The imaging device as set forth in claim 7, further comprising imaging-condition set means for setting said imaging means, based on the recommended imaging conditions represented by said desired imaging-condition information.

9. The imaging device as set forth in claim 7, wherein
said desired, recommended composition data have attendant information related to said recommended composition image; and
said archive means attaches said attendant information to said image data when archiving said image data.

10. The imaging device as set forth in claim 6, further comprising imaging-condition set means for setting said imaging means, based on the recommended imaging conditions represented by said desired imaging-condition information.

11. The imaging device as set forth in claim 10, further comprising imaging-condition-set switching means for switching ON and OFF states of said imaging-condition set means.

12. The imaging device as set forth in claim 11, wherein said read-out means reads out only said desired, recommended composition data correlated with the imaging-condition information which represents recommended imaging conditions settable in said imaging means.

13. The imaging device as set forth in claim 11, wherein
said desired, recommended composition data have attendant information related to said recommended composition image; and
said archive means attaches said attendant information to said image data when archiving said image data.

14. The imaging device as set forth in claim 10, wherein said read-out means reads out only said desired, recommended composition data correlated with the imaging-condition information which represents the recommended imaging conditions settable in said imaging means.

15. The imaging device as set forth in claim 14, wherein
said desired, recommended composition data have attendant information related to said recommended composition image; and
said archive means attaches said attendant information to said image data when archiving said image data.

16. The imaging device as set forth in claim 10, wherein
said desired, recommended composition data have attendant information related to said recommended composition image; and
said archive means attaches said attendant information to said image data when archiving said image data.

17. The imaging device as set forth in claim 6, wherein
said desired, recommended composition data have attendant information related to said recommended composition image; and
said archive means attaches said attendant information to said image data when archiving said image data.

18. The imaging device as set forth in claim 5, wherein
said desired, recommended composition data have attendant information related to said recommended composition image; and
said archive means attaches said attendant information to said image data when archiving said image data.

19. The imaging device as set forth in claim 1, further comprising read-out recognition means for informing that said desired, recommended composition data is read out, when reading out said desired, recommended composition data.

20. The imaging device as set forth in claim 1, wherein said display means includes selection display means for switching display and non-display of said recommended composition image.

21. The imaging device as set forth in claim 1, further comprising coincidence recognition means for informing that said recommended composition image displayed on said display means has coincided with the image representing said subject.

22. The imaging device as set forth in claim 1, further comprising photography-information-acquisition switching means for switching ON and OFF states of said photography information acquisition means.

23. The imaging device as set forth in claim 1, further comprising:
image switching means for switching ON and OFF states of said imaging means; and
switching display means for sequentially displaying recommended composition images, represented by the recommended composition data stored in said storage means, on said display means when said imaging means is in the OFF state.

24. An imaging device comprising:
imaging means for imaging a subject to acquire image data which represents said subject;
storage means for storing recommended composition data, which represent composition images that represent an image of a composition that is recommended in performing photography at various locations, in correlation with photography information including positional information which represents said various photography locations;
photography information acquisition means for acquiring said photography information;
read-out means for reading out desired, recommended composition data correlated with the photography information which corresponds to said acquired photography information, from said storage means, based on said acquired photography information; and
display means for superposing and displaying a recommended composition image represented by said desired, recommended composition data and an image represented by said image data,
wherein along with said positional information included in the photography information, said photography information also includes weather information which represents various recommended weather conditions suitable for photographing the recommended composition image at said various photography locations.

25. The imaging device as set forth in claim 24, wherein said photography information acquisition means includes global positioning system (GPS) means for acquiring GPS information as said photography information, based on radio waves from GPS satellites, and weather information acquisition means for accessing a weather information server which provides the weather information recommended at said various photography locations, to acquire the weather information recommended at said various photography locations; and the read-out means reads out said desired, recommended composition data correlated with the photography information, which contains the positional information corresponding to said GPS information and said acquired weather information, from said storage means, based on said GPS information and said acquired weather information.

26. An imaging device comprising:

an imaging part for imaging a subject to acquire image data which represents said subject and a memory part for temporarily storing the image data;

a storage medium for storing recommended composition data, which represent composition images that represent an image of a composition that is recommended in performing photography at various locations, in correlation with photography information including positional information which represents said various photography locations;

a global positioning system (GPS) for acquiring said photography information containing positional information for a location;

a data read-out device for reading out desired, recommended composition data correlated with the photography information which corresponds to said acquired photography information for the location, from said storage medium, based on said acquired photography information; and a display or viewfinder for superposing and displaying a recommended composition image represented by said desired, recommended composition data and an image represented by said image data, wherein along with said positional information included in the photography information, said photography information also includes date information which represents various recommended dates for performing photography at said various photography locations; and in addition to said various photography locations, said recommended composition data represent the composition images recommended on said various recommended dates for performing photography at said various photography locations, and when the photography information includes more than one recommended photography dates, each of the photography dates is ranked according to a relative degree of preference for performing photography.

27. The imaging device as set forth in claim 26, wherein said photography information includes weather information accessed through a weather information server which provides the weather information recommended at said photography location, to acquire the weather information recommended at said photography location.

28. The imaging device as set forth in claim 26, further comprising an archiving part for archiving the image data acquired by said imaging device.

29. The imaging device as set forth in claim 26, wherein said display or viewfinder includes a selection device for switching between a display mode and a non-display mode of said recommended composition image.

30. The imaging device as set forth in claim 26, further comprising coincidence recognition device for indicating that said recommended composition image displayed on said display or viewfinder has coincided with the image representing said subject.

31. The imaging device as set forth in claim 26, further comprising a photography-information-acquisition switching device for switching between ON and OFF states of said global positioning system (GPS).

32. An imaging device comprising:

an imaging part for imaging a subject to acquire image data which represents said subject and a memory part for temporarily storing the image data;

a storage medium for storing recommended composition data, which represent composition images that represent an image of a composition that is recommended in performing photography at various locations, in correlation with photography information including positional information which represents said various photography locations;

a global positioning system (GPS) for acquiring said photography information including the position information for a location;

a data read-out device for reading out desired, recommended composition data correlated with the photography information which corresponds to said acquired photography information for the location, from said storage medium, based on said acquired photography information; and a display or viewfinder for superposing and displaying a recommended composition image represented by said desired, recommended composition data and an image represented by said image data, wherein along with said positional information included in the photography information, said photography information also includes weather information which represents various recommended weather conditions suitable for photographing the recommended composition image at said various photography locations.

* * * * *